United States Patent [19]

Herr, Jr.

[11] Patent Number: 4,516,444
[45] Date of Patent: May 14, 1985

[54] HIGH-LOW BRAKED GEAR DRIVE

[75] Inventor: Charles H. Herr, Jr., Peoria, Ill.

[73] Assignee: Caterpillar Tractor Co., Peoria, Ill.

[21] Appl. No.: 177,681

[22] PCT Filed: Feb. 19, 1980

[86] PCT No.: PCT/US80/00167
§ 371 Date: Feb. 19, 1980
§ 102(e) Date: Feb. 19, 1980

[87] PCT Pub. No.: WO81/02453
PCT Pub. Date: Sep. 3, 1981

[51] Int. Cl.³ .................. F16H 3/44; F16H 57/10; B60K 41/24; F16D 67/02
[52] U.S. Cl. .................. 74/781 R; 192/12 C; 192/13 R
[58] Field of Search .............. 192/12 C, 18 A, 13 R; 74/781 R, 781 B, 782, 783

[56] References Cited
U.S. PATENT DOCUMENTS

| | | | |
|---|---|---|---|
| 2,115,964 | 5/1938 | Osborne | 74/781 R |
| 2,683,997 | 7/1954 | Forster | 74/781 R |
| 2,918,832 | 12/1959 | Meyers | 192/18 A |
| 3,164,036 | 1/1965 | Lamburn et al. | 74/781 R |
| 3,605,507 | 9/1971 | Ishihara et al. | 192/18 A |
| 3,797,332 | 3/1974 | Cameron et al. | 74/781 R |
| 3,978,742 | 9/1976 | Abbott | 74/781 R |
| 4,051,933 | 10/1977 | Beneke et al. | 192/18 A |
| 4,067,427 | 1/1978 | Cackley | 192/18 A |
| 4,078,639 | 3/1978 | Beneke | 192/18 A |
| 4,128,023 | 12/1978 | Kinder | 74/750 R |

FOREIGN PATENT DOCUMENTS 613252  1/1961  Canada ...................... 74/781 R

Primary Examiner—Leslie A. Braun
Attorney, Agent, or Firm—Wood, Dalton, Phillips, Mason & Rowe

[57] ABSTRACT

A power drive (10) for providing from a single speed range input drive motor (12) a dual speed range output and a braking function. The selective control of the output shaft (13) is effected through the use of only a brake and a clutch (27,28) under the control of pistons (33,40) and a biasing spring (38). The mechanism provides the desired control by suitable application of fluid pressure to associated piston chambers (34,41) thereby effecting different operating conditions and connections of the gearing (15,16,17,21,22) of the drive.

7 Claims, 4 Drawing Figures 4,516,444

HIGH-LOW BRAKED GEAR DRIVE

DESCRIPTION

1. Technical Field

This invention relates to power drives and in particular to power drives for use with a hydrostatic motor.

2. Background Art

In one prior art drive system disclosed in U.S. Pat. No. 4,051,933 of Jene A. Beneke et al, a low inertia clutch and brake system includes a rotatable shaft in high and low speed clutch assemblies spaced apart along the shaft. A brake assembly is disposed between the high and low clutch assemblies and includes friction means normally engaged with the housing to prevent rotation of the shaft. Fluid operated pistons are provided for selectively disengaging the brake assembly and engaging one of the clutch assemblies.

In U.S. Pat. No. 4,078,639, Jene A. Beneke discloses a two-speed clutch and brake system utilizing high and low speed clutch assemblies spaced apart along a rotatable shaft. A brake assembly is mounted between the clutch assemblies. Adjacent ones of the pistons and brake plates are interconnected so that the brake assembly is disengaged when either of the clutch assemblies is engaged. The structure is arranged so that when both of the clutch assemblies are disengaged, the brake plates engage the friction surfaces with a stationary housing to brake the shaft.

A transmission unit is shown, in U.S. Pat. No. 4,128,023 of Mark R. Kinder, to include cooperating gearing and clutches wherein both clutches may be disengaged in a free-wheeling mode, or selectively disengaged, against biasing means urging the clutches to engaged condition. The unit requires a ring gear fixed to the housing engaged by the planet gears meshed with the output shaft sun gear.

DISCLOSURE OF INVENTION

The present invention comprehends an improved power drive utilizing a pair of clutches driven from a single speed range drive motor to provide a multiple speed range output and a braking of the output as a result of selective control of the clutches.

More specifically, the invention comprehends providing such a power drive including means for selectively actuating the clutch means, and means for causing the output member to be selectively driven by the drive motor through the clutch means and gearing of the drive selectively in a low speed range and a high speed range, or braked as an incident of the selective actuation of the clutches.

The means for actuating the clutch means may comprise first and second piston means, respectively actuating the first and second clutches. The selective actuation of the clutches is effective solely by the control of the piston means.

In one of the driven connections provided by the clutch means, the output member is driven directly from the drive motor.

The drive mechanism may be arranged to provide a braked condition of the output member when the drive motor is stopped and brake release pressure is dropped.

Further more specifically, the invention comprehends such an improved power drive including a first element, a rotary power input element and a rotary power output element, an improved power transmission system for controlled connection of the input and output elements to provide selectively a high speed output, a low speed output, and a braked condition of the output, said improved power transmission system including a ring gear connected to the input element for rotation therewith, a sun gear coaxially of the ring gear, planet gears intermeshed with the ring and sun gears, carrier means carrying the planet gears and drivingly connected to the output element, first clutch means for selectively locking the sun gear to the fixed element, and second clutch means for selectively locking the sun gear to the ring gear, whereby the power transmission system selectively causes (a) the input element to be locked to the fixed element as a result of the first clutch means being arranged to lock the sun gear to the fixed element and the second clutch means being arranged to lock the sun gear to said ring gear, (b) the input element directly drives the output element as a result of the second clutch means being arranged to lock the sun gear to the ring gear and the first clutch means being arranged to permit rotation of the sun gear relative to the fixed element, or (c) the input element drives the output element at a reduced speed through the planet gears as a result of the first clutch means being arranged to lock the sun gear to the fixed element and the second clutch means being arranged to permit rotation of the ring gear relative to the sun gear.

The power drive structure may include spring means for biasing the clutches to the locking arrangement and means for selectively applying releasing forces to oppose the biasing action of the spring means for providing the desired control of the power drive.

Still further, the invention comprehends the provision of a power transmission system including first and second clutch means and improved means for selectively operating the clutch means including a first fluid pressure-operated force-applying means, a second fluid pressure-operated force-applying means, spring means biasing the first and second clutch means to an engaged condition, and force transfer means associated with the force-applying means for causing the first clutch means to be in the engaged condition and the second clutch means to be in released condition as a result of force being applied only by the first force-applying means, and the first clutch means to be in released condition and the second clutch means to be in the engaged condition as a result of force being applied by both the first and second force-applying means.

The power drive mechanism of the present invention is extremely simple and economical of construction while yet providing the improved functioning and operation discussed above in a novel and simple manner.

BEST MODE FOR CARRYING OUT THE INVENTION

Figure 1:
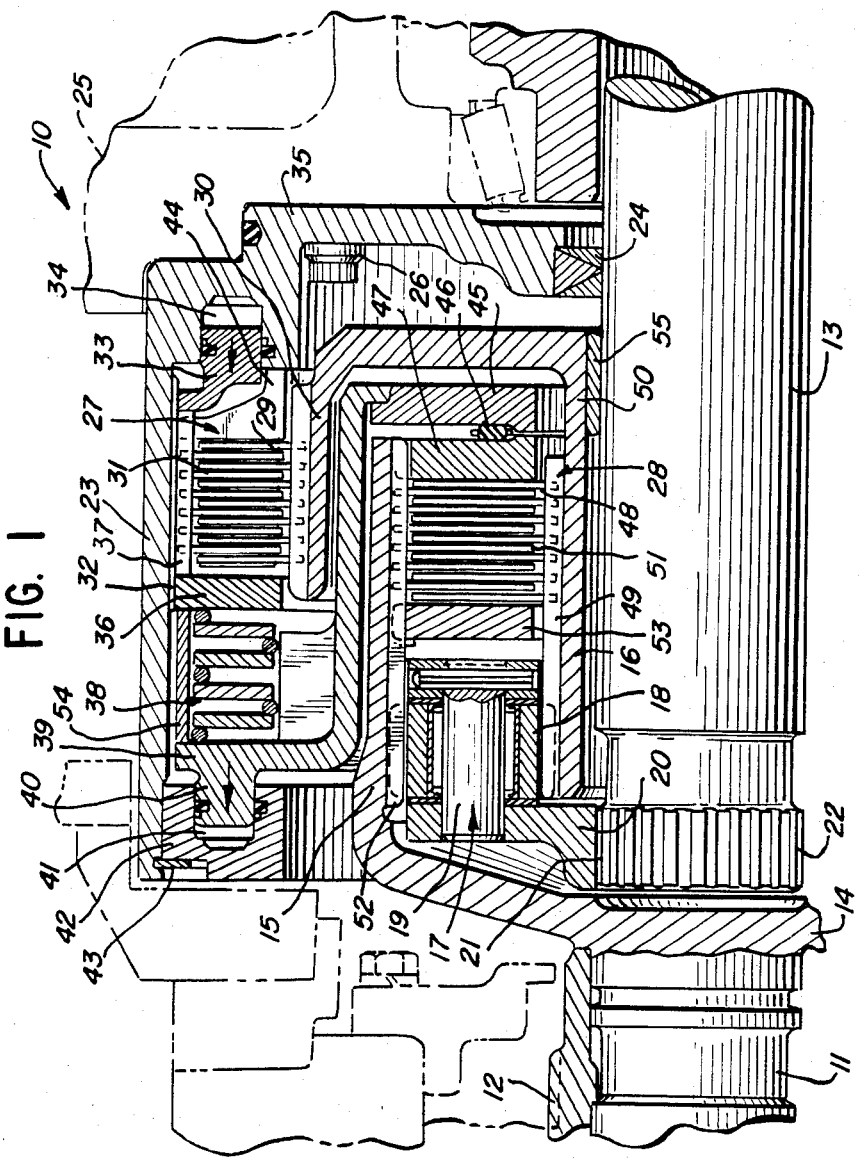
FIG. 1 is a fragmentary diametric section of a power drive mechanism embodying the invention, the mechanism being shown as arranged in a high speed range condition.

In the exemplary embodiment of the invention as disclosed in the drawing, a power drive generally designated 10 is shown to comprise a power transmission system wherein an input shaft 11 is driven by a drive motor, such as hydrostatic motor 12, for driving an output member, such as output shaft 13.

Referring to FIG. 1, input shaft 11 is provided with a flanged hub 14 defining a radially outer ring gear 15. The ring gear drives an inner sun gear 16 through a plurality of planet gear assemblies 17, each including a plurality of planet gears 18 carried on a suitable carrier 19. Carriers 19, in turn, are mounted to an output carrier 20 defining an output gear 21 meshing with a gear 22 provided on shaft 13.

An annular bearing 55 is provided between sun gear 16 and shaft 13 to center and stabilize the end of the sun gear furthest from the meshing planet gear carriers 19.

Mechanism 10 further includes an outer housing 23 provided with a bearing 24 for journaling the output shaft 13. As shown, the housing may be secured to a frame 25 by suitable bolts 26.

Disposed within housing 23 is a first clutch, or brake, 27 and a second clutch 28. Clutch 27 includes clutch plates 29 splined to a carrier portion 30 of sun gear 16, and clutch plates 31 splined to an inwardly directed spline 32 on housing 23 and thus functions as a brake in selectively locking the sun gear.

A high piston 33 is received in a piston chamber 34 defined by the end wall 35 of housing 23. Piston 33 is connected to the pressure plate 36 of brake 27 through a plurality of pins 37. Pressure plate 36 and load ring 39 are biased to engage brake 27 and clutch 28, respectively, by spring means 38 which may comprise a plurality of Belleville springs.

Load ring 39 defines a low piston 40 received in a piston chamber 41 of a housing portion 42 retained to the housing 23 by suitable securing ring 43.

Low piston 40 acts to remove spring means 38 force from clutch 28, leaving only first clutch 27 engaged.

Piston 33 acts on clutch 28 through pins 37, pressure plate 36, connector ring 54 and load ring 39. Load ring 39 includes a reaction plate portion 45 acting through a thrust bearing 46 against a clutch plate 47 of clutch 28. Clutch 28 includes first plates 48 splined to spline 49 on an extension 50 of sun gear 16. Second plates 51 of the clutch 28 are splined to a spline 52 on ring gear 15. A backup plate 53 is secured to ring gear 15 for transferring a thrust load from clutch 28 to the ring gear.

High piston 33 acts to overcome low piston 40 force and move pressure plate 36, spring means 38 and load ring 39 to the left. This movement removes the spring means 38 force from brake 27, disengaging it. Further movement engages clutch 28 through load ring 39.

As shown in FIG. 1, the power drive 10 is arranged to drive the output member 13 from drive motor 12 through a high speed range. In effecting such operation, a high fluid pressure, such as approximately 150 lbs. psi is applied to chamber 41 by suitable conventional means (not shown). In the illustrated embodiment, such pressure effects a force of approximately 4,070 lbs. on the low piston 40 urging it to the right. A fluid pressure of approximately 350 lbs. psi is applied to piston chamber 34 so as to provide a force of approximately 5,680 lbs. urging the piston 33 to the left. This force being transmitted through the push pins 37 urges the pressure plate 36 to the left in overcoming the lower force developed by piston 40 and acting through spring means 38 tending to urge pressure plate 36 to the right.

The pin 37 further acts through a connector ring 54 on load ring 39 to further move the reaction plate 45 to the left so as to cause clutch 28 to become engaged. Reaction plate 44 remains stationary at all times. The clutching force acting on clutch 28 is effectively approximately 1610 lbs., comprising the differential between the low piston force and the high piston force which, as indicated above, are opposed at this time. As the brake 27 remains disengaged, the clutching of the drive motor to the output shaft is effected solely through the clutch 28. The actuation of the clutch 28 causes ring gear 15, sun gear 16, and the output carrier 20 to be locked, thereby giving a direct drive to the output shaft 13 from the input shaft 11.

As will be obvious to those skilled in the art, the parameters, such as the areas and pressures of low piston 40 and high piston 33, may be varied as long as the desired forces and force differentials are provided.

Figure 2:
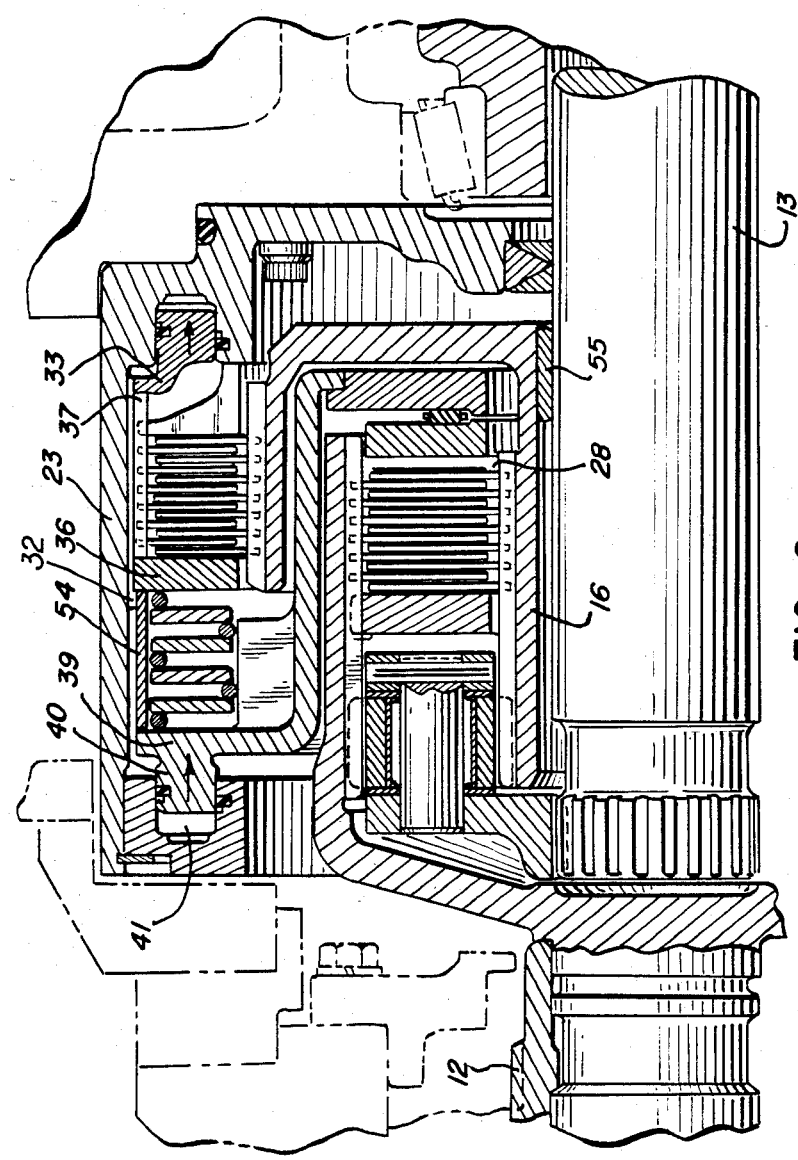
FIG. 2 is a fragmentary diametric section similar to that of FIG. 1 but showing the arrangement of the mechanism in a low speed range condition.

Referring now to the arrangement of FIG. 2, a low range driving of the output shaft 13 from the drive motor 12 is effected by removing pressure from the piston chamber 34 while maintaining the 150 lb. psi pressure on the low piston 40. Under such conditions, piston 40 is moved to the right, thereby moving the load ring 39 to the right to release the high clutch 28. Movement of the load ring 39 to the right further increases the force transmitted through spring means 38 acting on the plate 36 to approximately 3,790 lbs., the remainder of the high piston force being routed to housing 23 through the connector 54 and the ends of spline teeth 32. Under these conditions, sun gear 16 is locked to housing 23 by brake 27 and becomes the reaction member for the planetary gear assembly 17. This permits the ring gear 15 which is driven by the motor 12 to drive the output carrier 20 at reduced speed and with increased torque so as to define the low speed range operation of the drive system.

Figure 3:
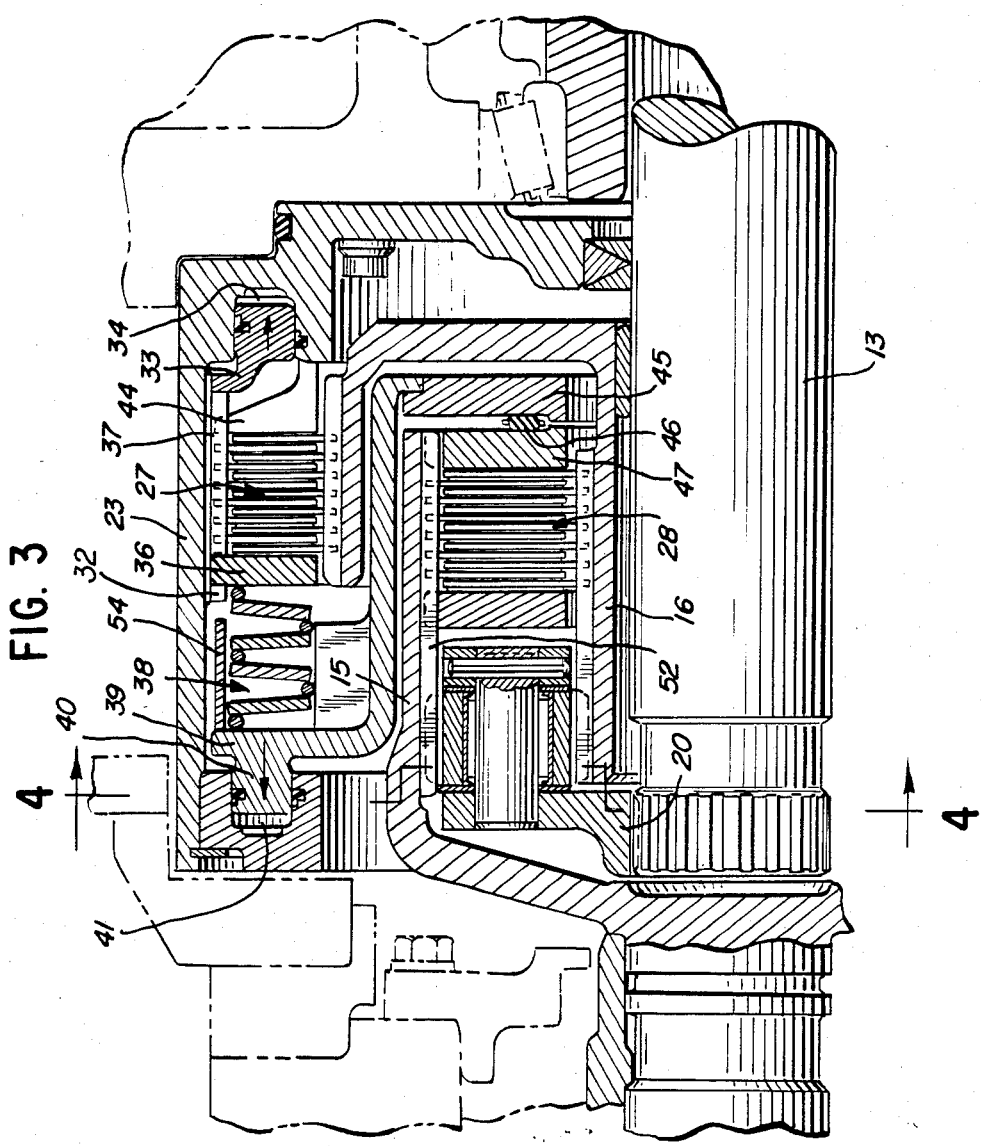
FIG. 3 is a fragmentary diametric section similar to that of FIG. 1 but showing the arrangement of the mechanism in a braked condition.
Figure 4:
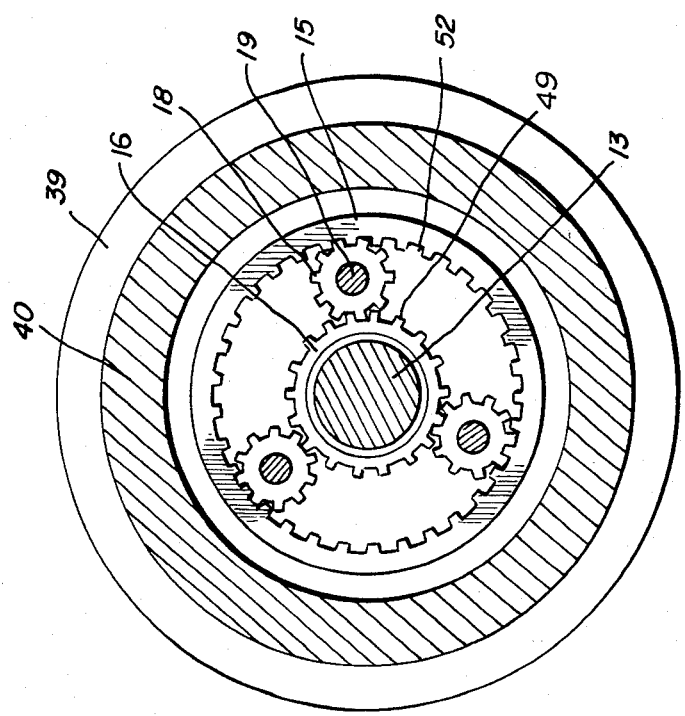
FIG. 4 is a transverse section taken substantially along the line 4-4 of FIG. 3.

Referring now to FIG. 3, the braked condition of the power drive is illustrated. As shown therein, spring means 38 is utilized to engage both the brake 27 and clutch 28 as a result of the removal of fluid pressure from each of the piston chambers 34 and 41. Under this condition, spring 38 acts through the pressure plate 36 and against the reaction plate 44 to actuate brake 27. Concurrently, the spring means urges the load ring 39 to the left, as seen in FIG. 3, causing reaction plate 45 to act through bearings 46 and clutch plate 47 to engage the clutch 28. The spring force may be approximately 3,700 lbs. so as to effect a positive actuation of the brake and clutch, thereby assuring that brake 27 effectively locks sun gear 16 to the housing 23 and clutch 28 locks the output carrier 20 to the sun gear 16, thereby effectively preventing rotation of the final drive shaft 13.

Thus, the power drive 10 provides an improved dual speed range drive of the output shaft member from a single speed range drive motor, as well as a braking of the output shaft member as a result of the control of fluid pressure to either of two piston chambers of the mechanism. The disposition of the mechanism in each of the three different operating conditions is effectively positive under the control of the pistons and biasing spring means.

In the event the drive motor is stopped, no pressure is applied to the piston chamber 41 and, thus effecting an automatic braking of output shaft 13.

INDUSTRIAL APPLICABILITY

The power drive of the present invention is adapted for a wide range of industrial applications. As will be obvious to those skilled in the art, the invention may be utilized in any power drive wherein a single speed range drive motor is employed with the output drive comprising a dual speed range output.

As will be obvious to those skilled in the art, the drive motor may comprise any conventional drive motor, the hydrostatic drive motor of the disclosure being exemplary only.

In the illustrated embodiment, the power drive provides both a direct connection mode and a speed reduction mode. As will be obvious to those skilled in the art, the drive may be utilized to provide a direct connection as well as an overdrive operation mode by interchanging the input and output connections.

The power drive is advantageously adapted for use where positive braking of the output shaft is required as the spring biasing means of the power drive effectively locks the output shaft when the piston chambers are vented.

The power drive may be advantageously utilized in connection with earthworking vehicles and the like conventionally utilizing such hydrostatic motors so as to provide extended drive ranges with the single speed range motor and permitting the selective speed range changing and braking operations by simple control of the pistons of the mechanism.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a power transmission system (10) having brake (27) and clutch means (28), improved means for selectively operating the clutch means comprising:
   a first fluid pressure-operated force-applying means (33,34);
   a second fluid pressure-operated force-applying means (40,41);
   spring means (38) biasing said brake and clutch means to an engaged condition; and
   force transfer means associated with said force-applying means (39) for causing alternatively (a) said brake means to be in the engaged condition and said clutch means to be in a released condition as a result of force being applied only by said first force-applying means, (b) said brake means to be in the released condition and said clutch means to be in the engaged condition as a result of forces applied by both said first and second force-applying means, or (c) said brake and clutch means concurrently to be in the engaged condition as a result of elimination of application of forces by the force-applying means.

2. The power transmission system of claim 1 wherein said spring means (38) is compressed between said brake (27) and clutch means (28).

3. The power transmission system of claim 1 wherein said spring means (38) is compressed between said brake (27) and clutch means (28) and means (39) are provided for selectively mechanically connecting said first and second force-applying means (33,34,40,41) in parallel with said spring means (38).

4. The power transmission system of claim 1 wherein said spring means (38) is compressed between said brake (27) and clutch means (28), said second force-applying means (40,41) developing a force substantially higher than the force developed by said first force-applying means (33,34).

5. The power transmission system of claim 1 wherein said force-applying means (33,34,40,41) comprise piston means.

6. The power transmission system of claim 1 wherein said spring means comprises Belleville spring means (38).

7. The power transmission system of claim 1 further including a fixed element (23), a rotary power input element (12), a rotary power output element (13), a ring gear (15) connected to said input element for rotation therewith relative to said fixed element (23), a sun gear (16) coaxially of said ring gear, planet gears (18) intermeshed with said ring and sun gears, and carrier means (19) carrying said planet gears and drivingly connected to said output element, said brake means (27) selectively locking said sun gear to said fixed element, and said clutch means (28) selectively locking said sun gear to said ring gear.

* * * * *